US009798553B2

(12) United States Patent
Morales

(10) Patent No.: US 9,798,553 B2
(45) Date of Patent: Oct. 24, 2017

(54) SYSTEMS FOR SECURELY CONNECTING TO REMOTE NETWORKS

(71) Applicant: National Information Assurance Corporation, Tampa, FL (US)

(72) Inventor: Giovanni M. Suarez Morales, Riverview, FL (US)

(73) Assignee: National Information Assurance Corporation, Tampa, FL (US)

( * ) Notice: Subject to any disclaimer, the term of this patent is extended or adjusted under 35 U.S.C. 154(b) by 254 days.

(21) Appl. No.: 14/824,497

(22) Filed: Aug. 12, 2015

(65) Prior Publication Data

US 2016/0048397 A1 Feb. 18, 2016

Related U.S. Application Data

(60) Provisional application No. 62/036,434, filed on Aug. 12, 2014.

(51) Int. Cl.

| G06F 9/00 | (2006.01) |
|---|---|
| G06F 15/177 | (2006.01) |
| G06F 12/14 | (2006.01) |
| G06F 9/44 | (2006.01) |
| H04L 9/32 | (2006.01) |
| H04L 29/06 | (2006.01) |
| H04W 12/02 | (2009.01) |
| G09C 1/00 | (2006.01) |

(52) U.S. Cl.
CPC ............... *G06F 9/441* (2013.01); *G09C 1/00* (2013.01); *H04L 9/3234* (2013.01); *H04L 63/0209* (2013.01); *H04L 63/0428* (2013.01); *H04W 12/02* (2013.01)

(58) Field of Classification Search
None
See application file for complete search history.

(56) References Cited

U.S. PATENT DOCUMENTS

| 5,305,384 A | 4/1994 | Ashby et al. |
|---|---|---|
| 7,535,861 B2 | 5/2009 | Buchholz et al. |
| 7,673,133 B2 | 3/2010 | Wesemann |
| 7,817,589 B2 | 10/2010 | Hoffmann et al. |
| 8,270,325 B2 | 9/2012 | Hoffmann et al. |
| 8,316,435 B1 | 11/2012 | Varadhan et al. |

(Continued)

*Primary Examiner* — Nitin Patel
(74) *Attorney, Agent, or Firm* — Shumaker, Loop & Kendrick, LLP; Jeffrey B. Fabian

(57) ABSTRACT

Systems enable secure communication links with classified or unclassified networks using a single mobile computing device. In one embodiment, the system includes: a mobile computing device without an integrated data storage device that is configured to interchangeably receive an unclassified or classified data storage device; an encrypter device in signal communication with the mobile computing device; network security device in signal communication with the encrypter device; a classified data storage device loaded with a computer readable code configured for booting the mobile computing device when the classified data storage device is connected to the mobile computing device; and an unclassified data storage device loaded with a computer readable code configured for booting the mobile computing device when the unclassified data storage device is connected to the mobile computing device.

20 Claims, 15 Drawing Sheets

(56) References Cited

U.S. PATENT DOCUMENTS

| | | | |
|---|---|---|---|
| 8,391,179 B2 | 3/2013 | Klausberger et al. | |
| 8,448,246 B2 | 5/2013 | Guerrero et al. | |
| 8,464,253 B2* | 6/2013 | Kim | G06F 9/45537 718/1 |
| 8,640,222 B2 | 1/2014 | Brown et al. | |
| 2009/0199290 A1 | 8/2009 | McCullough et al. | |
| 2013/0145440 A1* | 6/2013 | Adam | G06F 21/40 726/5 |
| 2013/0191907 A1 | 7/2013 | Falk et al. | |
| 2014/0013122 A1 | 1/2014 | Arnold et al. | |

* cited by examiner

SYSTEMS FOR SECURELY CONNECTING TO REMOTE NETWORKS

CROSS REFERENCE TO RELATED APPLICATION

This application claims priority from U.S. Provisional Application Ser. No. 62/036,434 filed Aug. 12, 2014, which is incorporated herein by reference in its entirety.

TECHNICAL FIELD AND BACKGROUND

The present invention relates generally to the field of computer networks, and more particularly, to systems that can be configured to connect to a plurality of classified and unclassified remote computer networks.

Individuals who utilize secure computer networks often need remote access to such networks when the individuals are working from home or traveling. Traditional methods for remotely connecting to a secure computer network require individuals to utilize dedicated computing devices that are configured to connect with only a single network. Individuals needing access to multiple secure networks are required to transport separate computer systems and devices for each network that the individual needs to access.

To illustrate, an individual that desires remote access to both the Nonsecure Internet Protocol Router Network ("NIPRNET") and the Secret Internet Protocol Router Network ("SIPRNET") would be required to have access to separate computers that are each dedicated to one of the two networks. In addition, the individual is required to transport other devices, such as an encrypter and appropriate adaptors to establish a secure, encrypted connection to classified networks.

Alternatively, an individual can configure a single computing device to run multiple virtual machines or remote desktop sessions with each machine or session connecting to a different remote network. However, these implementations have the substantial disadvantage that the virtual machines or remote sessions share valuable computing resources leading to reduced performance. Moreover, sharing resources between classified and unclassified networks poses a security risk and could violate regulatory requirements as well as the policies of the remote network provider.

SUMMARY

A need exists to provide systems configured to establish a connection with multiple classified or unclassified networks without using virtual machines or remote desktop sessions. Therefore, it is an object of the present invention to provide systems that use a single computing device, such as an Internet-enabled laptop or tablet computer, that can be configured to securely connect to multiple unclassified and classified networks. It is a further object of the present invention to provide a mobile system, or secure "fly-away kit" that includes all the necessary components required to quickly and conveniently establish a secure connection to unclassified and classified networks.

According to one embodiment of the invention, a secure communication system includes: a mobile computing device without an integrated data storage device where the mobile computing device is adapted to interchangeably receive a classified or unclassified data storage device; an encrypter in signal communication with the mobile computing device; a network security device in signal communication with the encrypter device; a classified data storage device loaded with a computer readable code configured for booting the mobile computing device when the classified data storage device is connected to the mobile computing device; and an unclassified data storage device loaded with a computer readable code configured for booting the mobile computing device when the unclassified data storage device is connected to the mobile computing device.

In one aspect of the invention, the mobile computing device is configured to not read data from or write data to the unclassified data storage device when the mobile computing device is booted from the classified data storage device and also configured to not read data from or write data to the classified data storage device when the mobile computing device is booted from the unclassified data storage device.

In one embodiment, the mobile computing device does not include an integrated wireless communication system, an integrated camera, or an integrated microphone. The secure communication system can include a trusted platform module integrated with the mobile computing device, and the mobile computing device can be a semiruggedized device. The secure communication system can also include various peripheral devices in signal communication with the mobile computing device, such as a push to talk headset, a card reader, or a web camera.

The secure communication system can be adapted to various communication configurations. For example, in one embodiment the network security device is in signal communication with the encrypter device through a wireless adapter and a wireless router. In another embodiment, the network security device is in signal communication with a satellite network through a broadband global area network satellite terminal. Additionally, when the mobile computing device is booted from the classified data storage device, the mobile computing device can be placed in signal communication with a remote network through an encrypted AES-256 communication link.

According to another embodiment of the invention, the secure communication system includes: a mobile computing device without an integrated data storage device where the mobile computing device is adapted to interchangeably receive a classified or unclassified data storage device; an encrypter device with a first data port and a second data port, where the first data port is in signal communication with the mobile computing device; an adaptor with an encrypter port and a network port, where the encrypter port is in signal communication with the second data port and the network port is in signal communication with a network gateway; a classified data storage device loaded with a computer readable code configured for booting the mobile computing device when the classified data storage device is connected to the mobile computing device; and an unclassified data storage device loaded with a computer readable code configured for booting the mobile computing device when the unclassified data storage device is connected to the mobile computing device. In various embodiments, the network gateway can be a satellite phone, a multi-function cellular device, and an end office switch of a public switched telephone network.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Disclosed are secure communication systems that allow users to establish a secure link to unclassified or classified remote networks using a single mobile computing device. The mobile computing device is booted from an unclassified data storage device when connecting to an unclassified remote network, and a network security device is used to establish a secure virtual private network ("VPN") tunnel to the remote network via a public network, such as the Internet. The mobile computing device is booted from a classified data storage device when connecting to a classified remote network, and an encryption device and a network security device are used to establish a secure, encrypted Type I and AES-256 VPN tunnel to the classified remote network through a public network.

Figure 1:
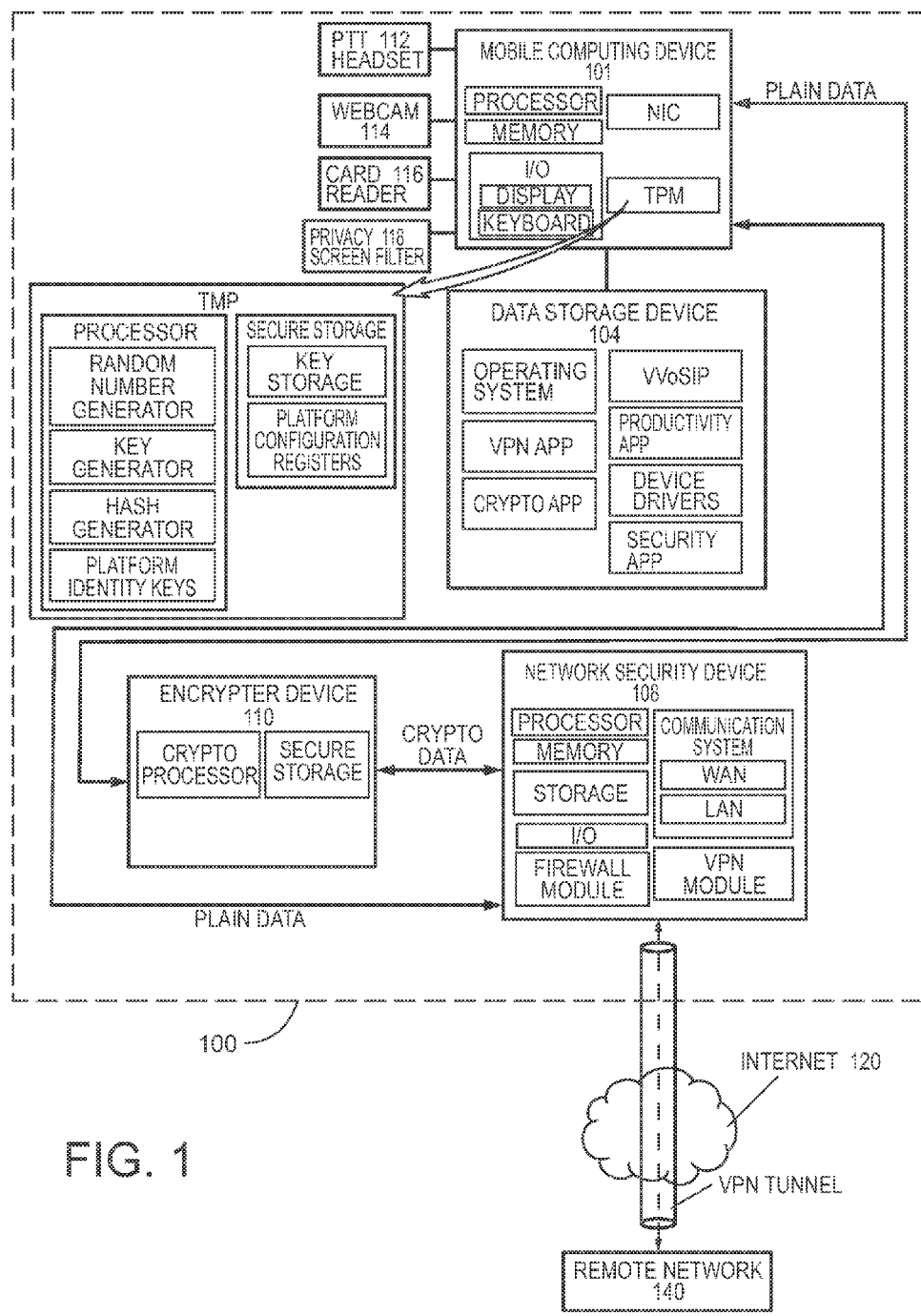
FIG. 1 is an exemplary hardware configuration for a system according to one embodiment of the invention.

A hardware configuration according to one embodiment of the invention is shown in FIG. 1. A secure communication system 100 generally includes a mobile computing device 101, unclassified and classified data storage devices 104a-b, an encrypter device 110, and a network security device 108 connected to a remote network 140 through a public network, such as the Internet 120. The system 100 can optionally include various peripheral input-output ("I/O") devices that connect to the mobile computing device 101 and enable secure voice, data, and video communication, such as a push-to-talk ("PTT") headset 112, a web camera 114, and a card reader 116.

The embodiment shown in FIG. 1 is not intended to be limiting, and one of ordinary skill in the art will recognize that the secure communication systems 100 of the present invention may be implemented using other suitable hardware or software configurations. For example, a single computing device can implement both the mobile computing device 101 and the encrypter device 110, or a single computing device can implement both the encrypter device 110 and the network security device 108. Alternatively, multiple computing devices can be used to implement any one of the mobile computing device 101, the encrypter device 110, or the network security device 108.

Any suitable computing device can be used to implement the mobile computing device 101, data storage devices 104, encrypter device 110, and network security device 108. The mobile computing device 101, encrypter device 110, and network security device 108 may include one or more processors that communicate with a number of peripheral subsystems via a bus system. These peripheral subsystems may include a storage subsystem, user-interface input devices, user-interface output devices, a communication system, and a network interface subsystem. By processing instructions stored on one or more storage devices 104, the processor may perform the steps of the communication methods disclosed. Any type of storage device may be used, including an optical storage device, a magnetic storage device, or a solid-state storage device.

In one embodiment, the network security device 108 establishes a link for accessing one or more remote networks 140 over the Internet 120 in the normal manner—e.g., through one or more remote connections, such as a Local Area Network ("LAN"), Wide Area Network ("WAN"), a data connection provided through a cellular service provider, or a data connection provided through a satellite communication network. These remote connections are merely representative of a numerous connections that can be made to the Internet 120 for accessing a remote network 140.

The secure communication system 100 is configured to establish a secure link to various unclassified or classified remote networks. Unclassified networks can include, for example, the Nonsecure Internet Protocol ("IP") Router Network ("NIPRNet") owned by the United States Department of Defense ("DoD") and maintained by the United States Defense Information Systems Agency ("DISA"). Classified networks can include the Secure Internet Protocol Router Network ("SIPRNet") also owned by the DoD and maintained by DISA.

Figure 2:
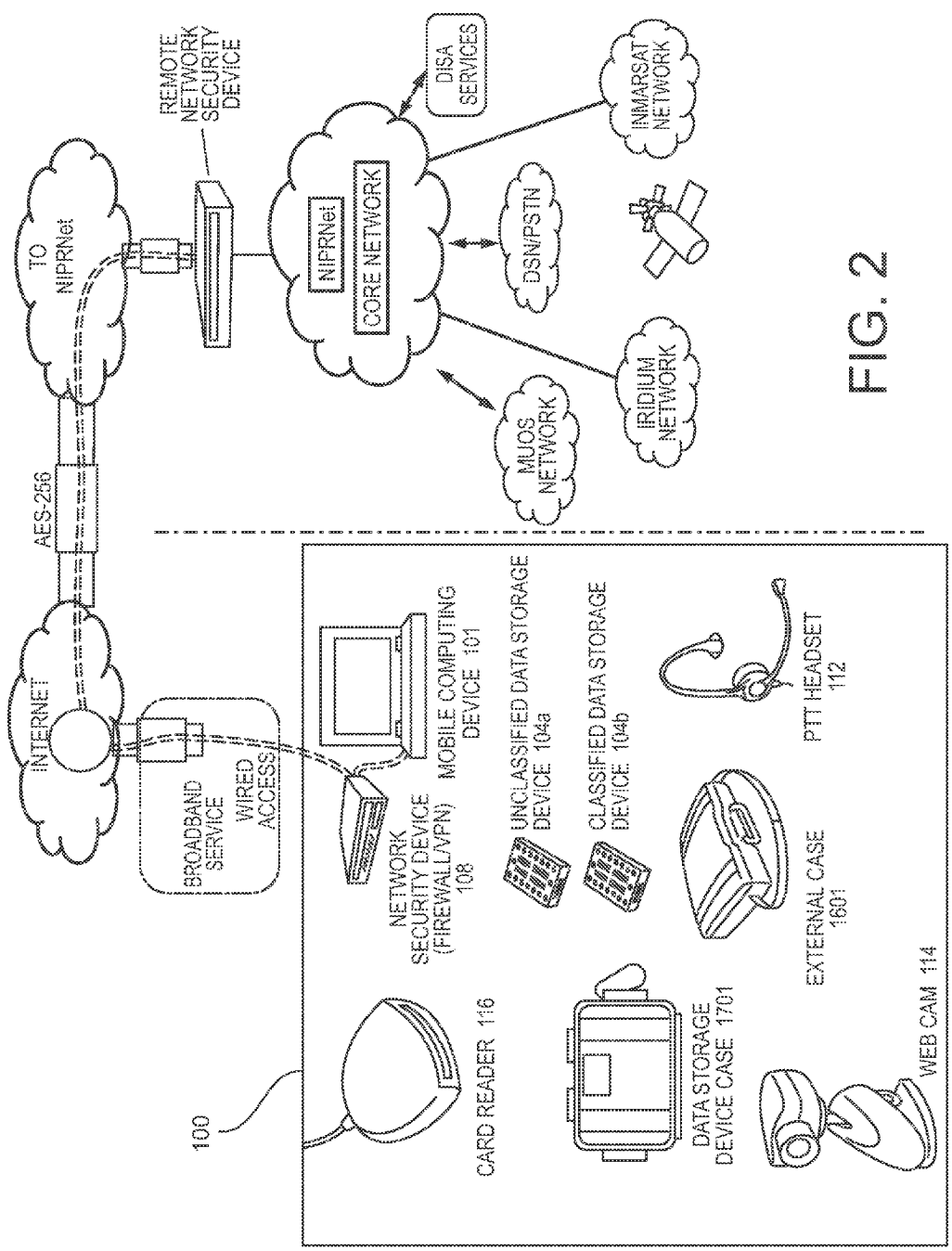
FIG. 2 is a system diagram illustrating a connection to an unclassified remote network.
Figure 3:
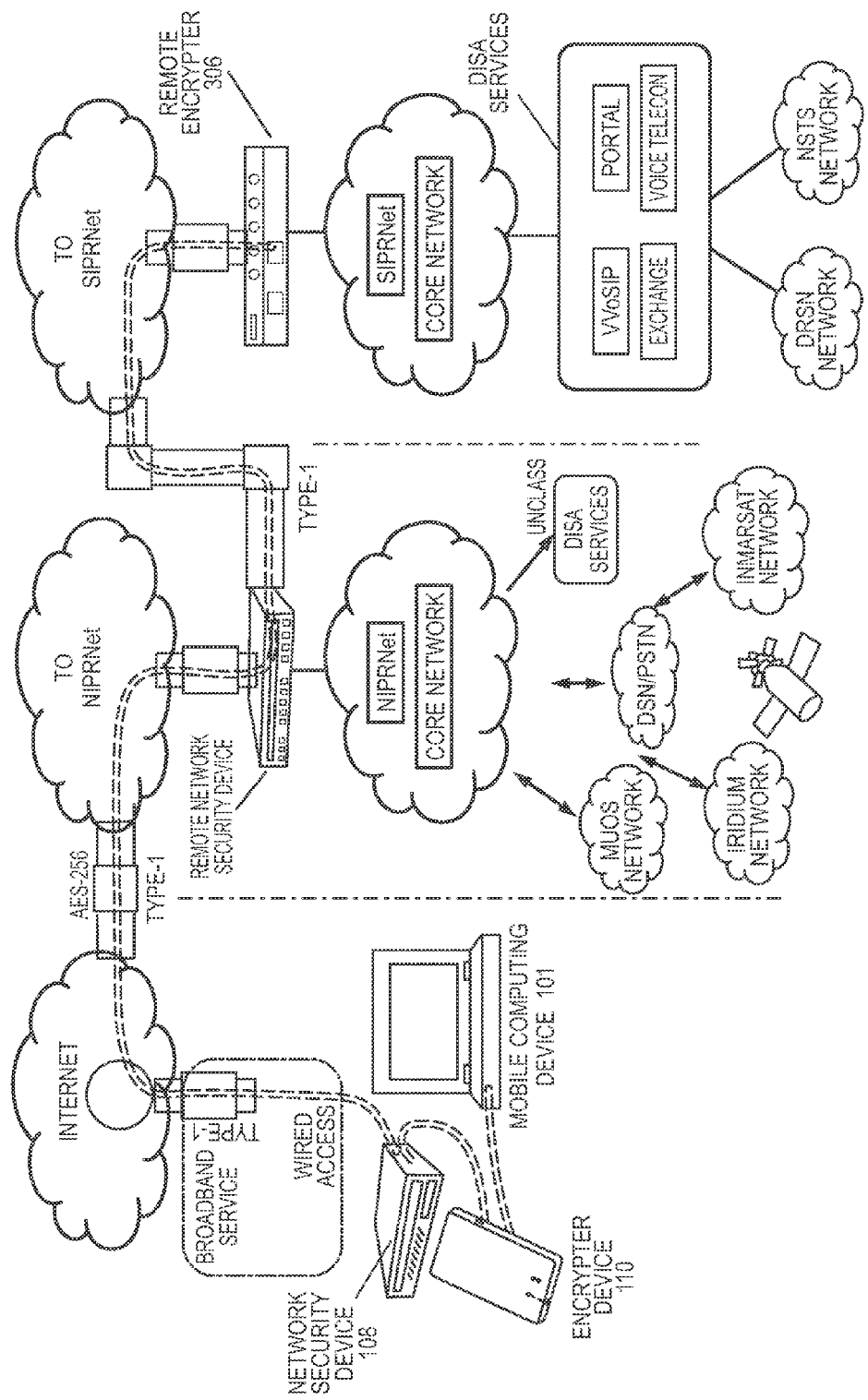
FIG. 3 is a system diagram illustrating a connection to a classified remote network through an unclassified network.

The secure communication system 100 can also be configured to communicate with a second remote unclassified or classified network through a first network, as shown in FIGS. 2-3. By way of example, the secure communication system 100 shown in FIG. 2 can first establish a connection to the NIPRNet before connecting to various unclassified network systems, including, but not limited to: (1) the Defense Switched Network/Public Switch Telephone Network ("DSN/PSTN"), which provides Internet telephone service through DISA; (2) DISA network systems that provide other services, like server hosting and network monitoring; (3) the Mobile User Objective System ("MUOS"); (4) the Iridium satellite network; and (5) the Inmarsat® satellite network. When connecting to an unclassified network, the user first boots the mobile computing device 101 from the unclassified data storage device 104a.

As shown in FIG. 3, the secure communication system 100 can also connect to a classified remote network (e.g., the SIPRNet) through an unclassified network (e.g., the NIPRNet) for purposes of connecting to various classified systems, such as the Defense Red Switch Network or the National Secure Telephone System. When connecting to a classified remote network 140, the user connects the encrypter device 110 to the mobile computing device 101 and boots the mobile computing device 101 from a classified data storage device 104b.

The secure communication systems 100 can be configured to comply with regulatory and certification requirements set by DISA or other agencies. In particular, some embodiments utilize components that meet DoD Unified Capabilities ("UC") Approved Product List ("APL") requirements. The UC APL requirements set standards for, among other things, data security, computing performance, information assurance, and interoperability. By way of example, UC APL information assurance requirements can dictate that computing devices configured for video and voice over secure IP ("VVoSIP") communication be capable of utilizing: hash-based authentication techniques (e.g., electronically signing communications using SHA-1 or SHA-2 hashing algorithms); secure real-time transport protocol ("SRTP") data-integrity techniques; advanced encryption standard ("AES") encryption techniques with 128, 192, or 256 bit block cyphers; or transport layer security protocols ("TLS") that implement asymmetric encryption techniques, such as the Rivest-Shamir-Adleman ("RSA") algorithm, elliptic curve cryptography, Internet Key Exchange protocols, or PGP encryption protocols, among others.

As a further example, UC APL requirements can provide that security devices, such as firewalls and virtual private networks, be configured to: deny establishment of an authorized user session based on the network source; enforce specified maximum quotas for transport-layer open connections that a source subject identifier can use over a specified period; log certain network events, such as dropping packets and the reasons the packet was dropped; or implement any other useful feature or security requirement. Other embodiments use only components that are manufactured in the United States or other designated countries in compliance with the Trade Agreements Act. Yet other embodiments utilize software and hardware devices that meet standards set out in the DISA Security Technical Implementation Guides.

The mobile computing device 101 can be any suitable type of portable electronic device, including, but not limited to, a cellular phone or a tablet computer. As another example, the mobile computing device 101 device can be a larger electronic device, such as a laptop computer. The mobile computing device 101 can include a display screen with a tactile interface as well as an integrated keyboard.

The secure communication system 100 can utilize standard portable electronic devices or ruggedized and semiruggedized portable electronic devices, such as those that comply with MIL-STD-810 standards. Ruggedized or semi-ruggedized devices are constructed to withstand certain environmental conditions, like exposure to high and low temperatures and temperature shocks; rain; humidity; sand and dust; transport shock; and gunfire vibration, among other conditions. One embodiment utilizes a mobile computing device 101 configured to withstand a three-foot drop on six faces and that includes data port covers engineered to withstand a torsion force of thirty kilograms per square centimeter. The mobile computing device 101 also provides dust ingress protection that meets International Electrotechnical Commission ("IEC") protection code standard IP5X, and the device features a sunlight readable display screen for outdoor use. The system 100 can also include a separate privacy screen filter 118 that connects to the mobile computing device 101 display screen for enhancing contrast and reducing glare while maintaining privacy by creating a narrow viewing angle.

The mobile computing device 101 includes one or more data ports for connecting devices that facilitate secure data, voice, and video communication. Examples of data ports may include a video graphics array ("VGA") connector, a high-definition multimedia interface ("HDMI") port, an eight-position-eight-contact ("8P8C") Ethernet port, a RS-232 port, a PMCIA port, a tip-ring-sleeve ("TRS") connector, a Universal Serial Bus ("USB") port, or a serial ATA connector. In some embodiments, the mobile computing device 101 further includes one or more drives for reading and writing to various removable storage media, such as a compact disc ("CD") or digital video disc ("DVD") drive. In yet another aspect of the invention, the mobile computing device 101 includes a network interface controller to communicate with other computing devices.

The mobile computing device 101 is configured to facilitate secure data, voice, and video communication and to comply with regulatory and certification requirements in part by omitting one or more integrated components and subsystems. In particular, the mobile computing device 101 may not include an integrated: (1) wireless communication system (e.g., a Wi-Fi® or Bluetooth® module); (2) microphone; (3) audio speaker; (4) camera (still or video); or (5) data storage device. Configuring the mobile computing device 101 so that it does not include a wireless communication system securely isolates the mobile computing device 101 and precludes the possibility that third-parties will gain unauthorized access to the device 101 through a wireless connection.

Similarly, configuring the mobile computing device 101 so that it does not include an integrated audio speaker, microphone, or camera prevents these devices from being used to output or gather data in an authorized manner if the devices are accessed by unauthorized third-parties or unintentionally left in an operating state by a system user. Instead of integrated devices, the secure communication system 100 can include separate peripheral devices, like a PTT headset 112, web camera 114, card reader 116, or optical mouse. The peripheral devices can be connected to the mobile computing device 101 through a USB connector, a TRS connector, or any other suitable data port.

To initiate a secure voice or video communication, a user must take the affirmative step of connecting a peripheral device to the mobile computing device 101 or the additional step of pressing a PTT button on the headset 112. Requiring a user to take one or more affirmative steps limits the possibility that the peripheral devices will be unintentionally activated and used to record, transmit, or output sensitive information. To illustrate, a user transmits secure voice communications by pressing the PTT button on the headset 112. When the PTT button is released, the transmission ceases. Thus, the communication link is not a persistent connection, and sensitive voice data cannot be transmitted when a user does not have the PTT button depressed. To further limit the channels through which an open-microphone security breach can occur, the PTT headset 112 may be configured without a PTT button bypass and the web camera 114 without an integrated microphone.

Security features integrated with the mobile computing device 101 include an integrated trusted platform module ("TPM"). The TPM is implemented as a microchip that performs a variety of security functions, including cryptographic key generation and control, random number generation, remote attestation, and secure storage of artifacts, like passwords, certificates, or encryption keys, that are used to authenticate the mobile computing device 101 platform configuration. The TPM can also store cryptographic keys used to encrypt information stored on a data storage device 104.

Remote attestation creates a one-way hash summary of the mobile computing device 101 hardware and software configuration that allows the system 100 to verify whether the configuration has changed. If the configuration of the platform has changed as a result of unauthorized activities, access to certain data and applications can be denied. Hashing techniques apply a hashing algorithm to known data to create a one-way hash value. Any suitable hashing algorithm can be used, including, but not limited to, SHA-1 or SHA-2 algorithms. A one-way hash value is preferably a value of fixed length that is unique to the known data. In other words, if the known data (i.e., data representing the platform configuration) is changed in any respect, the hash value will also change. The hash value, thus, acts as a fingerprint for the known data. As an example, the known data can be a text file created during boot up that lists the operating system software build and connected devices. If the operating system software or hardware configuration is altered, then the text file and resulting one way hash will be changed.

Other security features include a separate card reader 116 for reading identity-authentication data stored on an identification card, such as a driver's license or a common access card ("CAC") issued by the DoD. Identity-authentication data can be stored on an identification card using a magnetic strip, bar code, integrated circuit, or any other suitable storage means known to one of ordinary skill in the art. The mobile computing device 101 can optionally include a fingerprint scanner, optical scanner, or other devices configured to receive biometric data used to identify a user.

The separate data storage devices 104 can be any suitable type of electronic storage device, including, for example, an external hard drive configured for tool-free connection to the mobile computing device 101 through a serial ATA connector. The data storage devices 104 are a nonvolatile memory medium used as secondary storage for the mobile computing device 101. The data storage devices 104 are typically formatted by operating system software according to a file system format to provide the abstraction necessary to organize data into files and directories. Those of ordinary skill in the art will recognize that the term data storage device does not refer to primary volatile storage directly accessed by the central processing unit (e.g., RAM) or nonvolatile storage media necessarily integrated with various subsystem components. Nonvolatile storage integrated with subsystem components includes, for example, nonvolatile primary storage containing startup software (i.e., BIOS) or nonvolatile storage integrated with the TPM and used to store device specific information.

The secure communication system 100 generally includes separate unclassified and classified data storage devices 104a-b that are used for connecting respectively to unclassified and classified remote networks 140. Using separate unclassified and classified data storage devices 104 and configuring the mobile computing device 101 without an integrated data storage device 104 ensures the security of sensitive data by prohibiting the storage of classified information on a data storage device that is used to connect to an unclassified network.

The data storage devices 104 optionally utilize software or hardware disk encryption techniques to encrypt some or all of the data stored on the data storage device 104. Software-based encryption uses the mobile computing device 101 processor to encrypt data and perform other cryptographic operations. Hardware-based encryption on the other hand, uses a dedicated processor integrated with the data storage device 104 to encrypt stored data. Some embodiments utilize full disk encryption ("FDE") to encrypt all the information stored on the data storage device 104, including the mobile computing device 101 operating system. A user can access the stored data only after successfully authenticating the user's identity with, for instance, a username and password. Alternatively, the system 100 may utilize volume encryption to encrypt only portions of the data stored to the data storage devices 104.

The unclassified and classified data storage devices 104 include an integrated operating system software application that manages mobile computing device 101 hardware resources, establishes and maintains a file system, implements common services for other software applications, and provides a user interface, among other functions. The operating system and other integrated software applications can implement graphical user interface screens that permit users to input data and receive output data. The user-interface screens may include features for accepting user inputs, such as text boxes, hyperlinks, pull-down menus, check boxes, radio buttons, and the like.

In addition to the operating system, the data storage devices 104 can also include other useful integrated software applications. As an example, the data storage devices 104 generally contain device driver software that provides application programmable interfaces ("APIs") for controlling various hardware devices, including the PTT headset 112, web camera 114, card reader 116, data storage devices 104, encrypter device 110, or network security device 108. Other integrated software applications implement functions such as productivity applications (e.g., word processing, spreadsheet processing, email communication), secure video teleconferencing, VVoSIP, instant messaging, or various security features (e.g., drive encryption, firewalls, antivirus protection, etc.). Software that implements these functions includes, for example, Cisco® IP Communicator software, the Microsoft Office® software suite, Microsoft® BitLocker drive encryption, or the Microsoft Lync® real-time communications platform.

The operating system and TPM may be configured to prevent simultaneous use of multiple data storage devices 104 or the use of data storage devices 104 other than those authenticated to the system (i.e., the separate unclassified and classified storage devices). So, for example, if a user attempts to simultaneously connect both the unclassified and classified data storage devices 104, the mobile computing device 101 will boot from only the data storage device 104 connected to the tool-free serial ATA connector and ignore the second data storage device 104. In this configuration, the user will not be able to read data from, or write data to, the second data storage device 104. The mobile computing device 101 will likewise ignore data storage devices that cannot be authenticated or that are connected to data ports that are not authorized to receive a bootable storage device.

The operating system can incorporate additional security features that are activated when the mobile computing device 101 is booted from the classified data storage device 104b. As an example, the operating system may disable removable media drives (e.g., a CD or DVD drive) as well as certain data ports (e.g., the USB, RS-232, or PMCIA ports) when the mobile computing device 101 boots from the classified storage device 104. In this manner, sensitive data cannot be removed from the system 100 via one of the disabled drives or data ports.

The network security device 108 has one or more processors that implement networking and security features, such as firewalls, VPNs, intrusion prevention systems ("IPSs"), network monitoring, event and traffic logging, group policy operations (e.g., password policies, user access permissions to certain features, etc.), antivirus protection, spam filtering, phishing prevention, and web-filtering services. The IPS monitors communications and system operations for malicious activities and actively blocks detected intrusions. In particular, an IPS can take such actions as sending an alert to the user, dropping malicious data packets, resetting a connection, or blocking communications from a specified IP address. An IPS can also facilitate data integrity by correcting cyclic redundancy check errors, unfragmenting packet streams, and preventing transmission control protocol sequencing issues.

Although the embodiments disclosed are generally described with reference to the use of a network security device to establish a VPN tunnel, those of ordinary skill in the art will recognize that clientless VPNs can also be used, such as a secure socket later ("SSL") VPN. Additionally, the mobile computing device 101 can also establish a link directly to a remote network 140 without the use of a VPN if the connection is established through a secure, nonpublic network; security is provided for in some other manner; or security is not otherwise a concern.

A user securely connects to an unclassified or classified remote network 140 through a VPN tunnel established by the network security device 108 or the encrypter device 110. A VPN is a private network that uses tunneling techniques to connect remote networks and users over a public network (e.g., the Internet). Tunneling techniques encapsulate an entire data packet within another data packet for transmission. Tunneling generally requires three different protocols: (1) the passenger protocol used to create a packet of the original data; (2) the encapsulating protocol that is wrapped around the original data; and (3) the carrier protocol used by the network over which the information is traveling. Any suitable tunneling protocol can be used to generate and encapsulate data packets, including IPsec, point-to-point tunneling protocol ("PPTP"), layer two tunneling protocol ("L2TP"), Internetwork Packet Exchange ("IPX"), NetBeui, or TCP/IP. Tunneling protocols can incorporate functions that encrypt the data packets, ensure data integrity (i.e., that the data was not altered during transmission), authenticate the device that originated the transmission, filter packets, and implement nonrepudiation through digital signatures.

The process of establishing a VPN can be better understood with reference to the following simplified example. To connect to a remote network 140, a user first boots a mobile computing device 101 from the appropriate unclassified or classified data storage device 104. The user then initiates a VPN software application integrated with the data storage device 104 and specifies an IP address or name of a gateway for the remote network 140. The user may be prompted to authenticate his or her identity with a username and password, biometric information, or by scanning a CAC using an attached card reader 116.

The remote network 140 may use, for instance, NetBeui to communicate between computing devices within a local area network. Before transmitting a communication, the mobile computing device 101 first formats the communication data into a NetBeui frame that is readable by devices within the remote network 140. The NetBeui frame is then encapsulated within a point-to-point protocol ("PPP") packet and encrypted using, for example, AES-256 encryption. The PPP packet is then encapsulated within a TCP/IP packet for transmission over the Internet to the remote network 140. By encrypting the PPP packet, the communication data and identity of the communication source is secured and cannot be read by third-parties that might intercept the packet.

Figure 4:
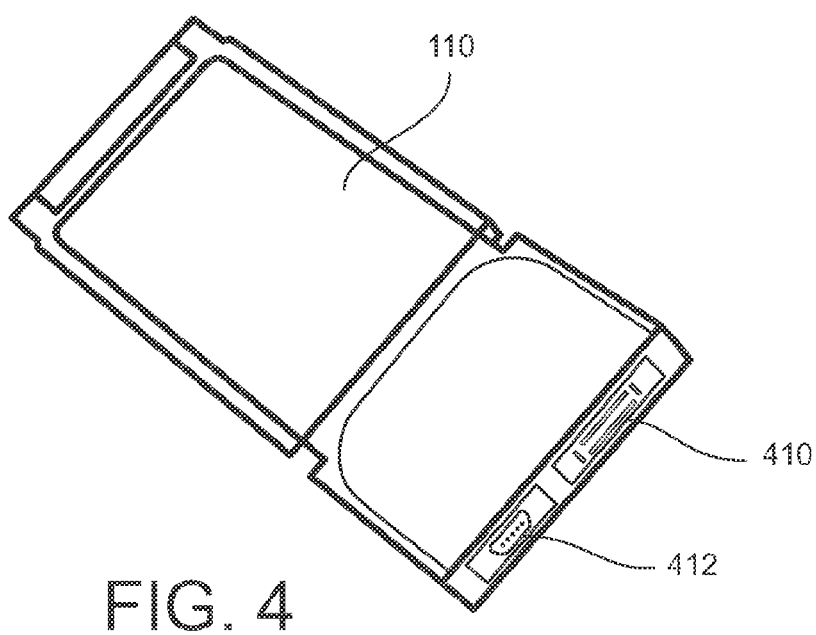
FIG. 4 illustrates an exemplary encrypter device.
Figure 5:
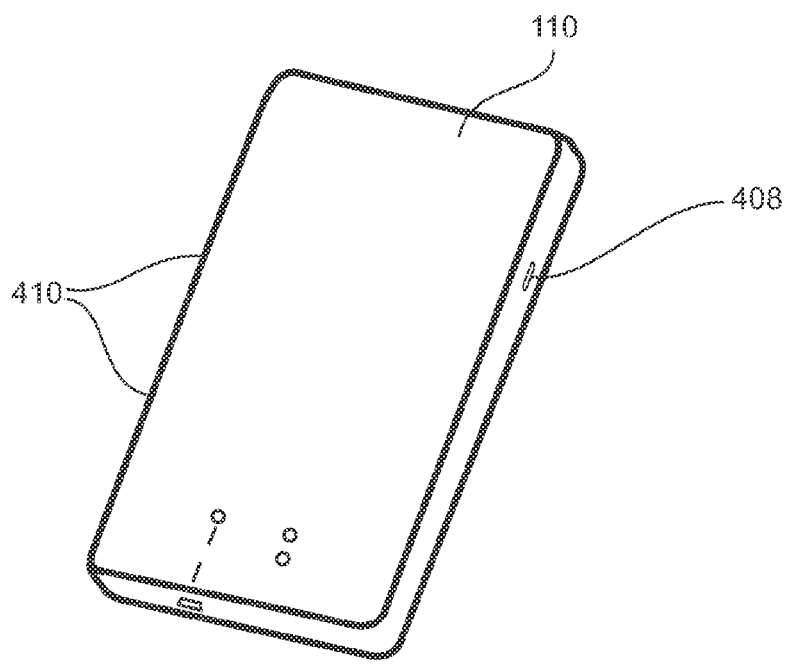
FIG. 5 illustrates an exemplary encrypter device.
Figure 6C:
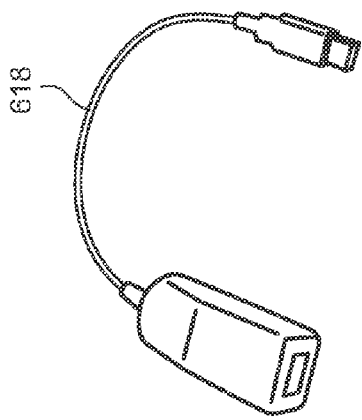
FIGS. 6a-f illustrate various encrypter device adaptors.
Figure 6E:
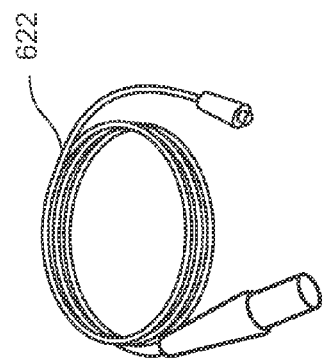
Figure 6D:
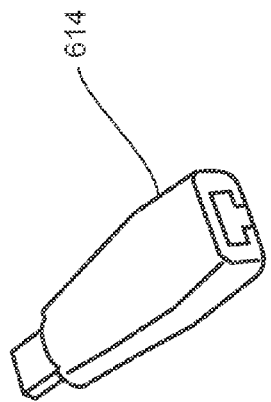
Figure 6F:
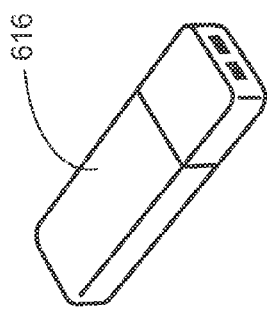
Figure 6A:
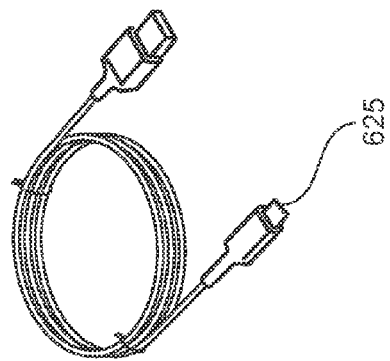
Figure 6B:
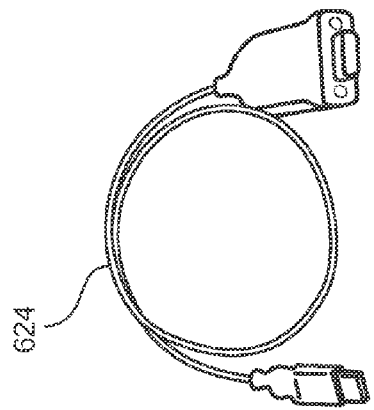

To establish a link to a classified network, a user connects the encrypter device 110 to the mobile computing device 101 and boots from the classified data storage device 104b. Exemplary encrypter devices 110 are shown in FIGS. 4-5 and include one or more processors for encrypting and decrypting data in transit as well as nonvolatile storage for securely storing cryptographic keys, user authentication data, or any other relevant data. In one embodiment, the encrypter device 110 is configured to interface with cryptographic key fill devices for replacing or loading additional cryptographic keys. The encrypter device 110 can interface with a crypto fill device through a cryptographic key fill port 408 or by using a cryptographic key fill adaptor 622.

The encrypter device 110 may connect to the mobile computing device 101 through any suitable data port, including the PMCIA slot, as shown in FIG. 4, or the USB port, as shown in FIG. 5. The encrypter device 110 may use any suitable secure communication protocol known to one of ordinary skill in the art, including the High Assurance Internet Protocol Encrypter Interoperability Specification ("HAIPE-IS") or the Secure Communications Interoperability Protocol ("SCIP") certified by the United States National Security Agency ("NSA").

Figure 7:
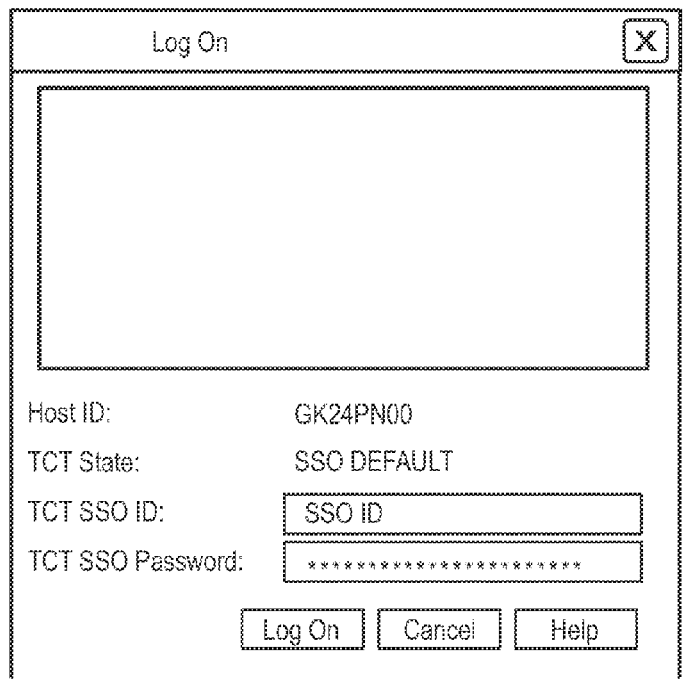
FIG. 7 is an exemplary display screen for logging on to the encrypter device.
Figure 8:
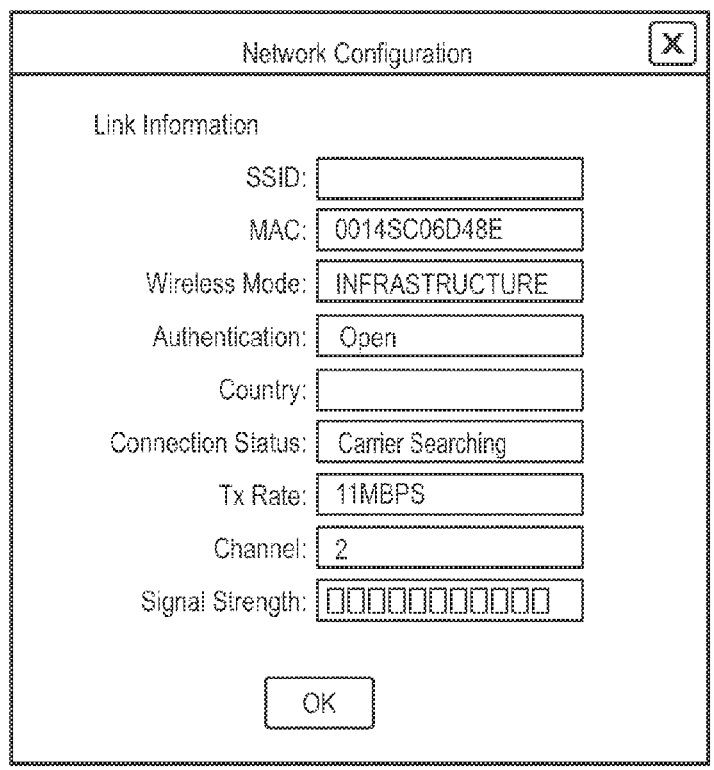
FIG. 8 is an exemplary display screen for configuring the encrypter device.

The user can interface with the encrypter device 110 through a graphical user interface implemented by an encrypter software application integrated with the data storage device 104. The user can initiate the software application by selecting an icon on the mobile computing device 101 display screen, or alternatively, the encrypter device software can launch automatically on boot up of the mobile computing device 101. The user can be required to logon to the encrypter device 110 by entering a username and password in a dialog box or window, such as the exemplary dialog box shown in FIG. 7. The encrypter device 110 can be configured by entering settings data in a dialog box or window, as illustrated in FIG. 8.

The embodiment of the encrypter device 110 shown in FIG. 5 connects to the mobile computing device USB data port. The encrypter device 110 includes one or more data ports, like a type A 410 or type B 412 USB port, for connecting various adaptors. The encrypter device can accommodate a variety of adaptors, including, but not limited to the exemplary adaptors shown in FIGS. 6a-f: (1) USB-to-Ethernet adaptors 614; (2) wireless adaptors 616; (3) USB-to-V.90 modem adaptors 618; (4) USB cryptographic key fill adaptors 622; (5) USB-to-RS-232 adaptors 624; or (6) USB-to-micro-USB adapters 625. One of ordinary skill in the art will recognize that these examples are not intended to be limiting, and the encrypter device 110 can be connected to the mobile computing device 101 using any suitable data port, and the encrypter device 110 can accommodate a variety of adaptor types.

Figure 9:
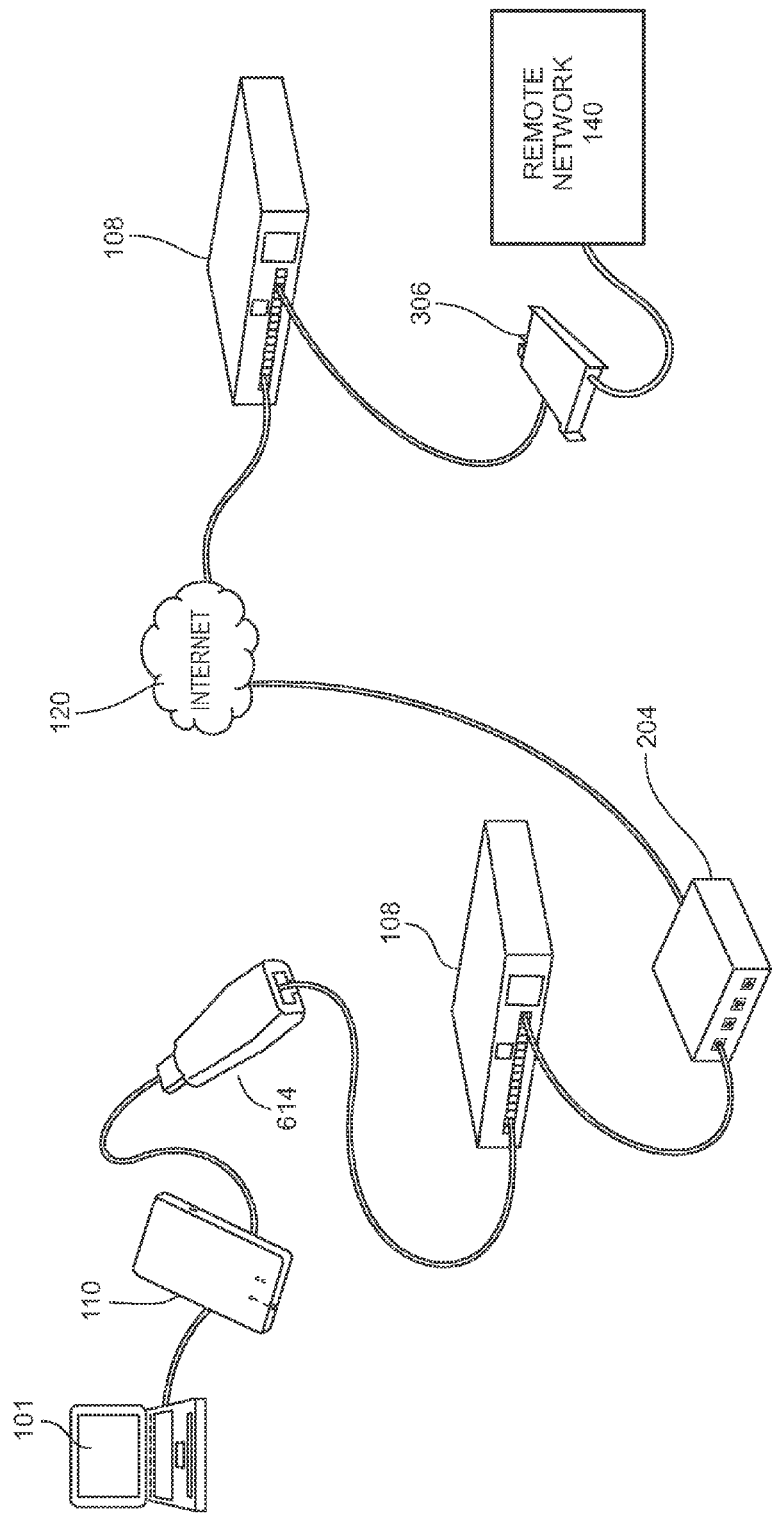
FIG. 9 is an exemplary hardware configuration for connecting to a classified remote network through an Ethernet connection.

The adaptors permit the mobile computing device 101 to establish a secure connection to a classified remote network 140 through a variety of channels, as illustrated in FIGS. 9-14. Connection channels include: (1) a hardwire Ethernet connection; (2) a Wi-Fi® connection; (3) a satellite communication connection; (4) a cellular network connection; and (5) a dial-up connection. The embodiment shown in FIG. 9 illustrates connection to a classified remote network 140 using an Ethernet connector. The encrypter device 110 is installed into the USB port of the mobile computing device 101, and the USB-to-Ethernet adaptor 614 is inserted into an encrypter device USB port 410 or 412. The encrypter device 110 is connected to the network security device 108 using an Ethernet cable that mates with the Ethernet port of the USB-to-Ethernet adaptor 614. The network security device 108 is connected to the Internet through an Internet service provider ("ISP") 204.

The embodiment shown in FIG. 9 utilizes symmetric key encryption and VPN techniques to establish a Type I encrypted tunnel to the remote network 140. Communications transmitted by the mobile computing device 101 are encrypted by the encrypter device 110 using a cryptographic key known to both the encrypter device 110 and a corresponding remote encrypter 306. Upon receipt of a communication transmitted by the mobile computing device 101, the remote encrypter 306 utilizes the cryptographic key to decrypt the message. The encryption is symmetric in that both encrypter devices 110 and 306 utilize the same cryptographic key to encrypt and decrypt communications.

Communications can also be encrypted by the network security device 108 using asymmetric encryption techniques. In a particular communication session between two devices, each device can utilize its own public-private cryptographic key pair. The cryptographic key pairs can be exchanged between devices during the initiation of a communication session. Alternatively, the encryption key pairs can be preinstalled on the computing devices prior to being placed into production. In other words, prior to being used to implement the systems of the present invention, the network security device 108 can be loaded with both its own public-private encryption key pair and the public-private key pair of a gateway computing device or router (not shown) for the remote network 140.

During a communication session where the mobile computing device 101 transmits a communication to the remote network 140, the network security device 108 first encrypts the communication using the remote network public key. Upon receipt of the communication from the mobile computing device 101, the remote network uses the corresponding remote network private key to unencrypt the communication. Conversely, if a computing device on the remote network transmits a communication to the mobile computing device 101, the remote network device must first encrypt the message using a separate public key associated with the network security device 108. The network security device 108 unencrypts the communication received from the remote network device using a corresponding private key.

Figure 10:
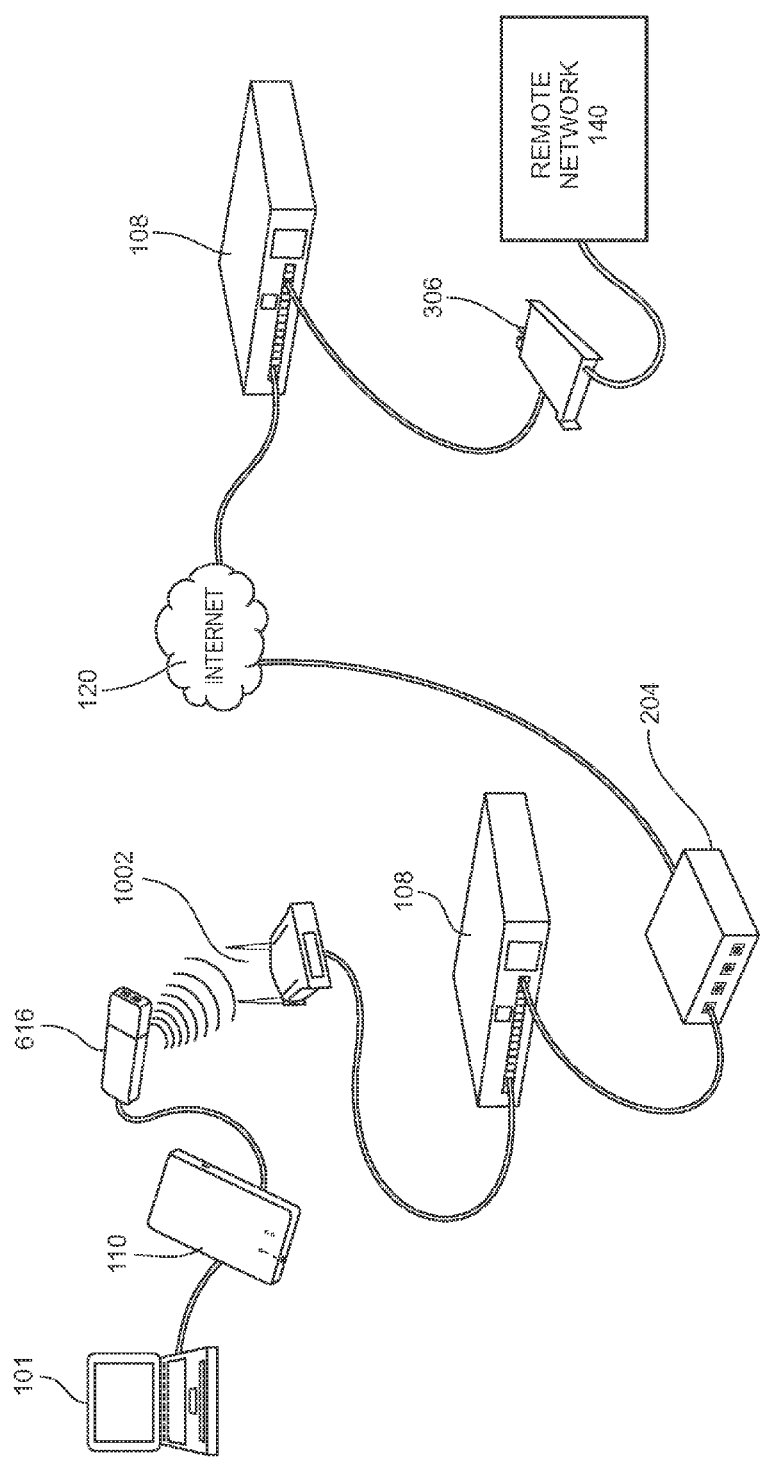
FIG. 10 is an exemplary hardware configuration for connecting to a classified remote network through a wireless communication network.

FIG. 10 illustrates a configuration for establishing a secure connection to a remote network 140 using a wireless link. In this embodiment, the USB-to-Ethernet adaptor 614 is replaced with a wireless adaptor 616 that transmits communications from the mobile computing device 101 to a wireless router 1002. The wireless router is connected to the network security device 108, which in turn connects to the Internet 120 through an ISP 204. As in the embodiment shown in FIG. 8, communications are encrypted by the encrypter device 110 and network security device 108 prior to being transmitted to the remote network 140 over the Internet 120. The communications are then routed through a second network security device 108 paired with the first device before being transmitted to the remote network 140 through the remote encrypter 306.

Figure 11:
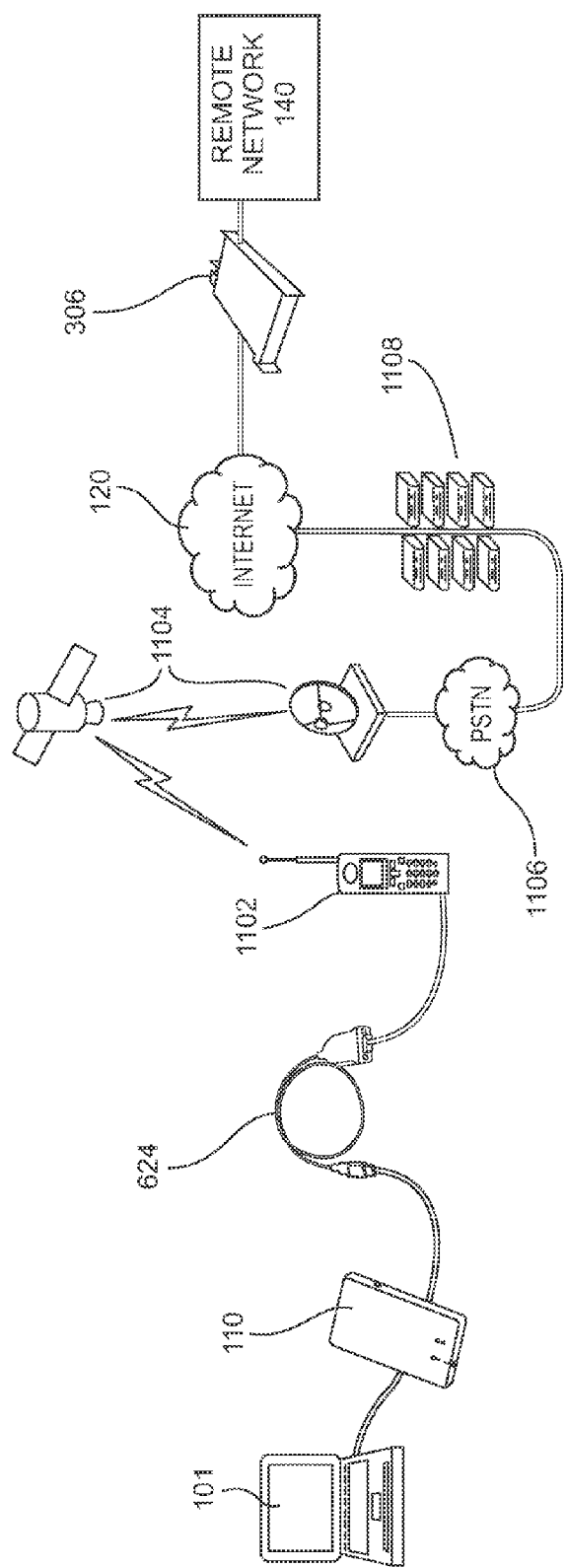
FIG. 11 is an exemplary hardware configuration for connecting to a classified remote network through a satellite phone voice communication network.

Secure connection to a remote network 140 through a satellite communication system is illustrated in FIG. 11. In this embodiment, the mobile computing device 101 is connected to a satellite phone 1102 through the encrypter device 110 and USB-to-RS-232 adaptor 624. The link can be established without a VPN if the satellite network is sufficiently secure. Alternatively, an application-based SSL VPN can be used, or a network security device 108 can be connected between the encrypter device 110 and the satellite phone 1102. Communications are encrypted by the encrypter device 110 and network security device 108 and transmitted by the satellite phone 1102 to a satellite network 1104, such as the MUOS or Iridium satellite networks. The communication is then routed to the remote network 140 through a PSTN 1106 and an Internet PSTN gateway 1108.

Figure 12:
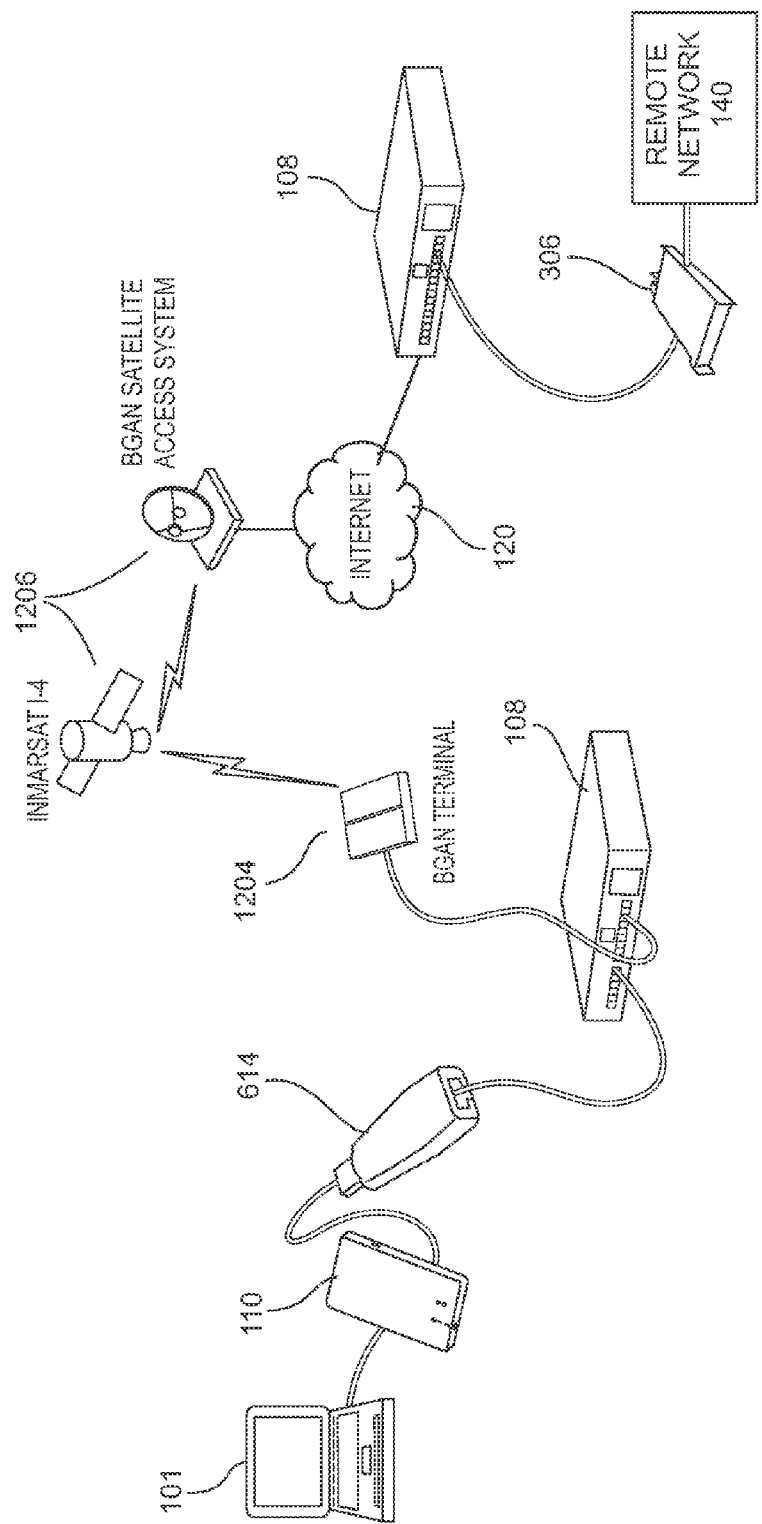
FIG. 12 is an exemplary hardware configuration for connecting to a classified remote network through a broadband global area network ("BGAN") satellite terminal.

An exemplary configuration for connection to the Inmarsat satellite network is shown in FIG. 12. For connection to the Inmarsat network 1206, the mobile computing device 101 is connected to a broadband global area network ("BGAN") terminal 1204 via the encrypter device 110, USB-to-Ethernet adapter 614, and network security device 108 to create a NIPRNET AES-256 VPN tunnel with its remote network security device 108 pair. The BGAN terminal 1204 transmits communications to the Inmarsat network 1206, which then routes the communications through the Internet 120 to the remote network 140 through a second network security device 108 and the remote encrypter 306. Those of ordinary skill in the art will appreciate that other satellite terminals can be used in place of the BGAN terminal 1204, such as a lite, medium, or heavy Special Operation Forces ("SOF") Deployable Node ("SDN").

Figure 13:
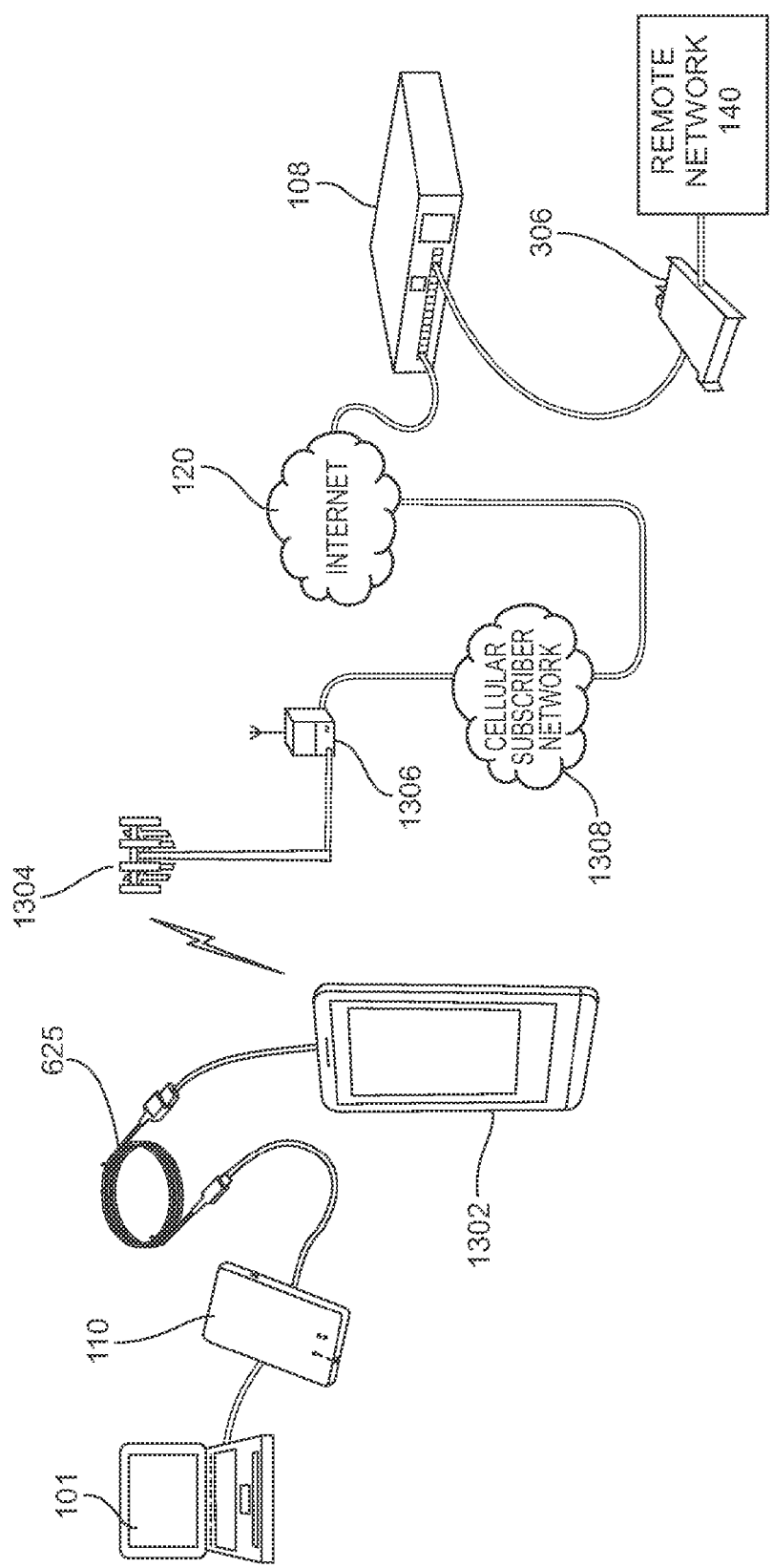
FIG. 13 is an exemplary hardware configuration for connecting to a classified remote network through a multi-function cellular device's cellphone network.
Figure 14:
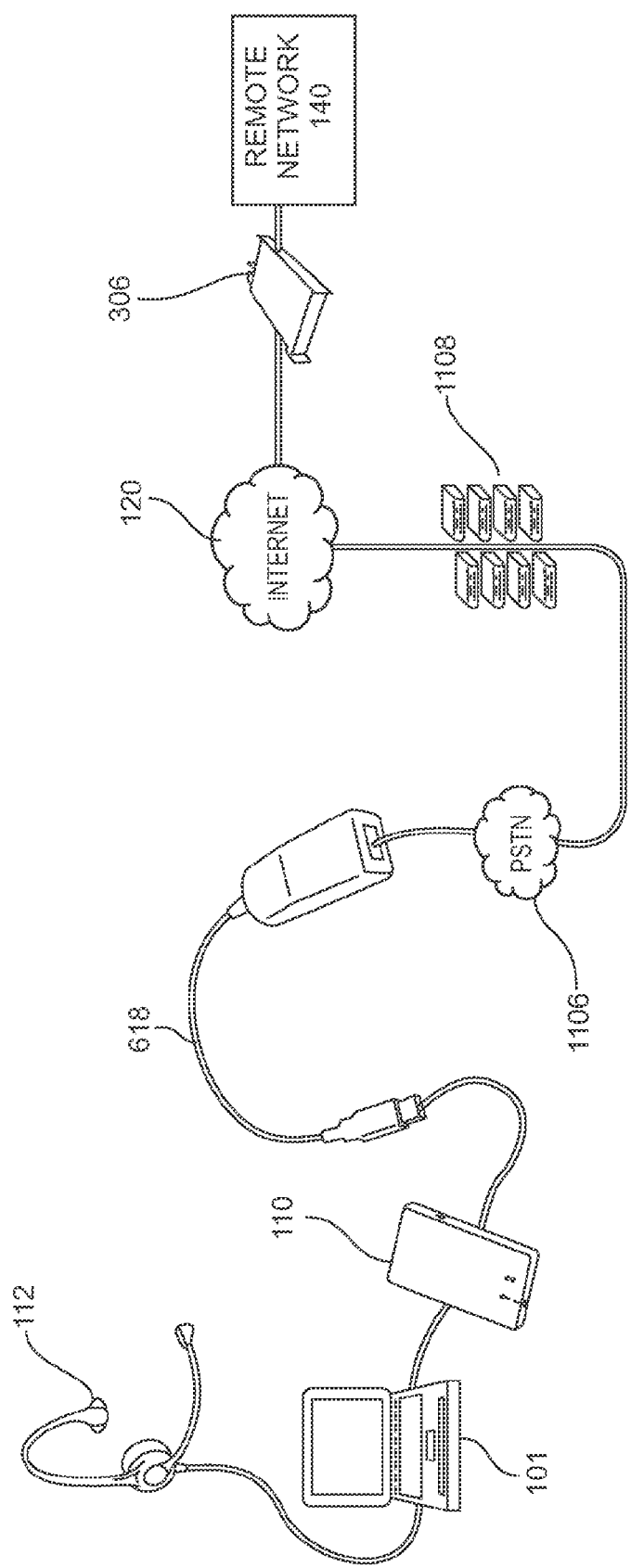
FIG. 14 is an exemplary hardware configuration for connecting to a classified remote network through a dial-up v.90 modem connection.

In another embodiment shown in FIG. 13, the secure communication system can be configured to communicate through a cellular telephone network. To connect to the remote network 140 through a cellular telephone network, the mobile computing device 101 is connected to a multi-function cellular device (e.g., a smartphone) 1302 through the encrypter device 110 and a USB-to-micro-USB connector 625. Communications are encrypted by the encrypter device 110 and transmitted by the multifunction cellular device 1302 to a cellular subscriber network 1308 through a base transceiver station 1304 and a base controller station 1306. The cellular subscriber network 1308 contains various components for implementing the cellular network, such as a mobile switching center that implements home and visitor location registers, authentication centers, a link to the public switched telephone network 1106, and a link to the Internet 120. The multifunction cellular device 1302 can be any suitable electronic device configured to interface with the encrypter device 110, such as a BlackBerry® Z30 mobile telephone available through BlackBerry Corporation of Waterloo, Ontario. The secure communication can be configured to communicate over a variety of cellular network types, including a Long Term Evolution ("LTE") network utilizing orthogonal frequency division multiple access ("FDMA") techniques, a XLTE network, a Global Systems Mobile ("GSM") network, a Code Division Multiple Access ("CDMA") network, a General Packet Radio Service ("GPRS"), or any other suitable cellular network.

The secure communication system can also be configured to communicate through a dial-up connection in situations where a broadband connection is not available. In this configuration, illustrated in FIG. 14, the mobile computing device 101 is connected to a PSTN 1106 through the encrypter device 110 and USB-to-V.90 modem adaptor 618. Communications are encrypted by the encrypter device 110 and transmitted to the remote network 140 through the PSTN 1106 and Internet PSTN gateway 1108. Alternatively, the USB-to-V.90 modem adaptor 618 can be replaced by a USB-to-Ethernet 614 adaptor that connects to a network security device 108, and the network security device 108 can be connected to a dial-up modem for interfacing with the PSTN 1106.

Figure 15:
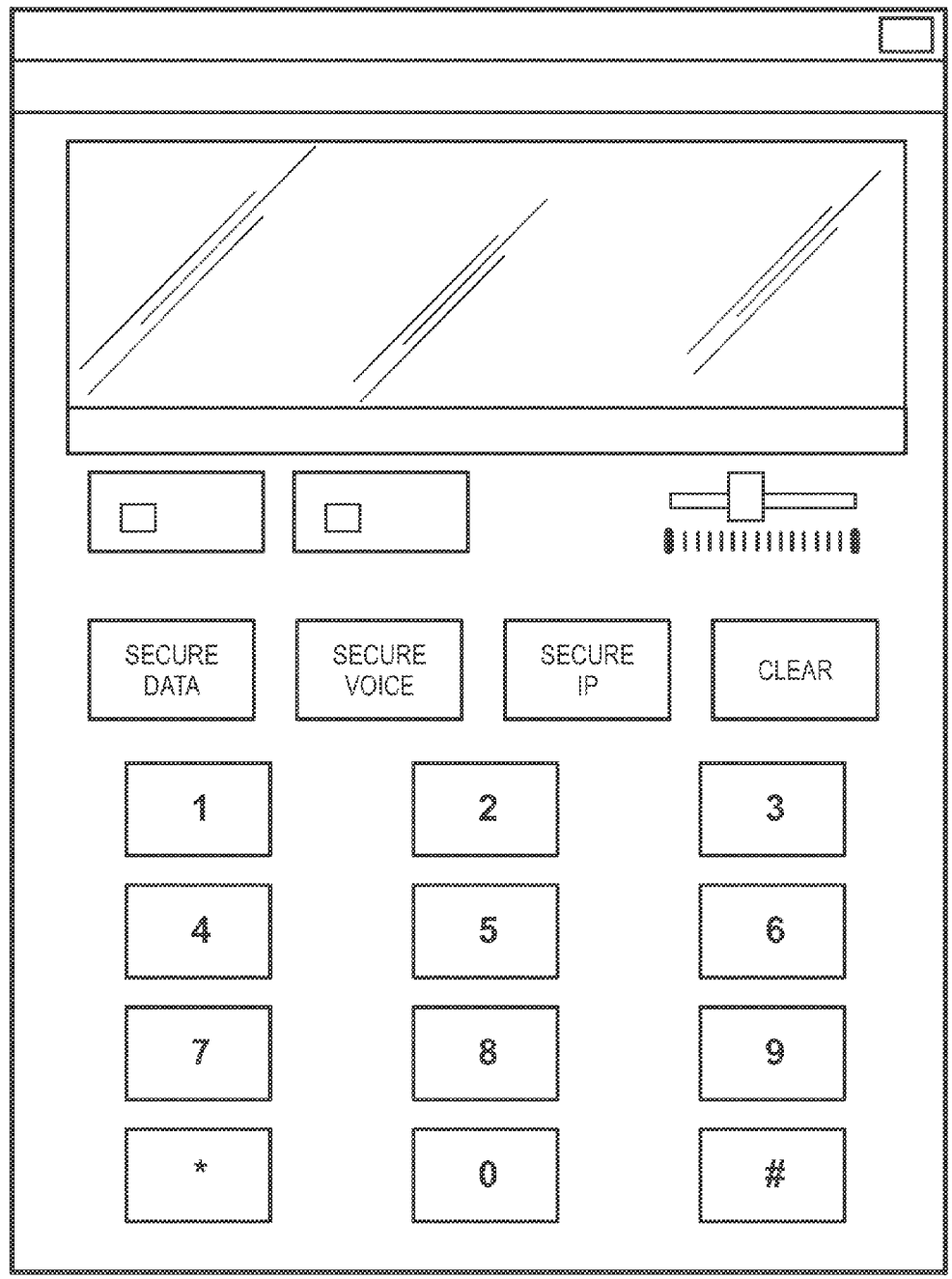
FIG. 15 is an exemplary display screen for dialing a telephone number to initiate a secure voice connection.

A PTT headset 112 is connected to the mobile computing device 101 and used to make secure voice calls through the Ethernet, wireless, satellite, dial-up, or cellular links illustrated in FIGS. 9-14. A dialer software application can be integrated with the data storage device 104. The dialer software application is used to place secure voice calls by dialing the desired phone number on the exemplary graphical key pad shown in FIG. 15.

Figure 16:
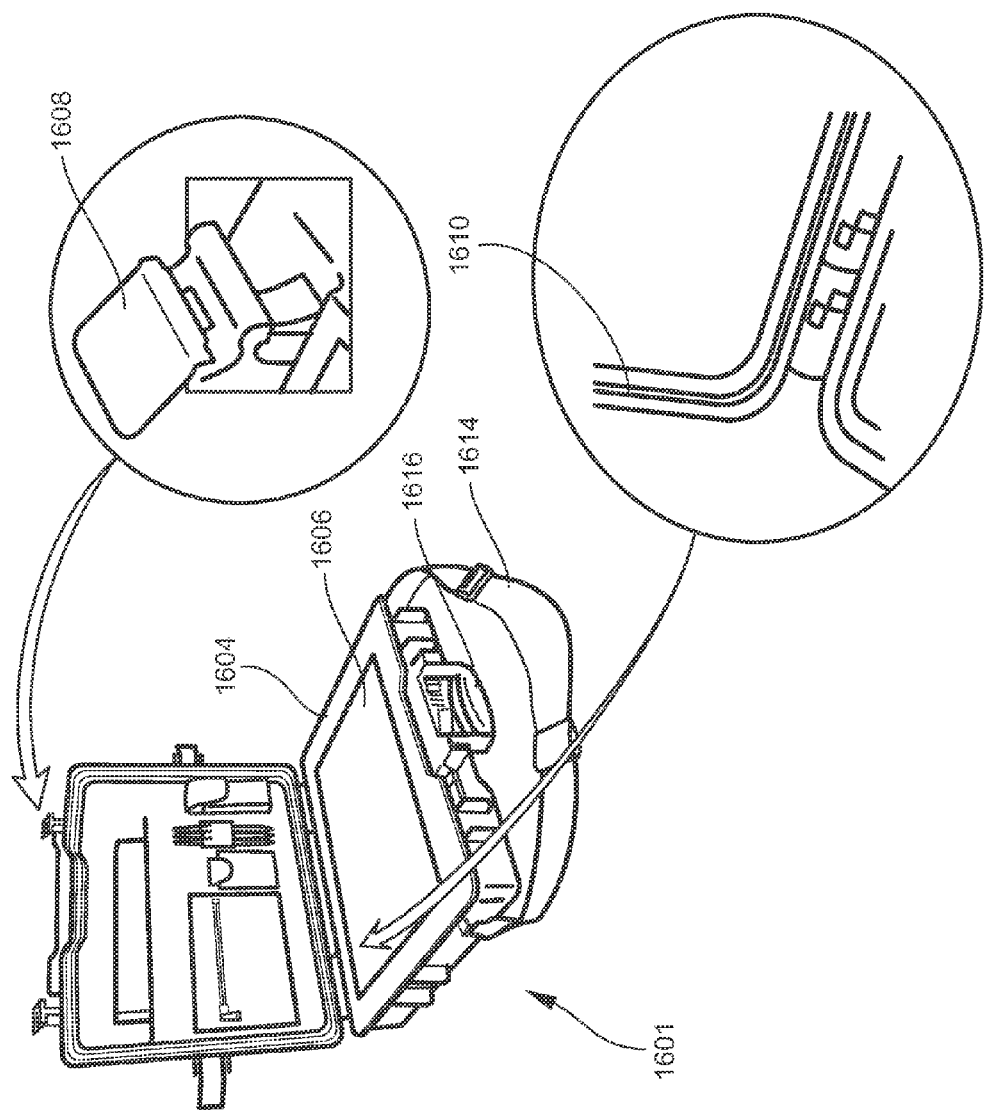
FIG. 16 is an exemplary external case for storing system components during transport.
Figure 17:
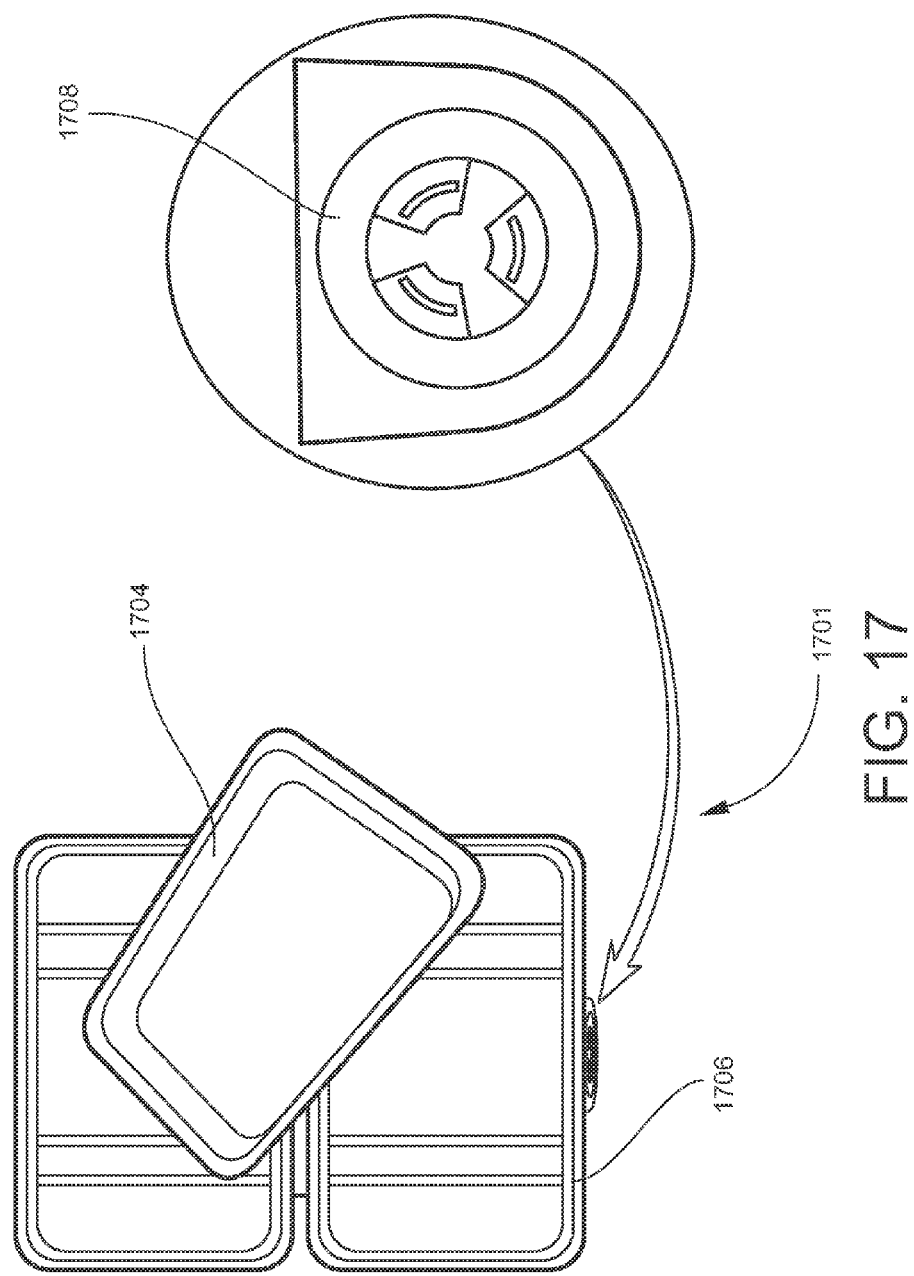
FIG. 17 is an exemplary data storage device case for storing a data storage device during transport.

To facilitate safe, convenient transport of the secure communication system 100, some embodiments include an external case 1601 for storing components of the system during transport as well as separate data storage device cases 1701 for protecting the data storage devices 104 during transport. An exemplary external case 1601 is shown in FIG. 16 and includes a foam insert 1604 with cutouts 1606 for receiving system 100 components. Securing the system 100 components within the foam cutouts 1606 ensures that the components are not subject to excessive jostling or displacement during transport, thereby minimizing the risk of damage. An exemplary data storage device case 1701 is depicted in FIG. 17 and includes a soft interior liner 1704 or a foam insert 1604 with cutouts shaped to receive the data storage devices 104.

The external case 1601 and the data storage device case 1701 are made from any suitable rigid, lightweight material known to those of ordinary skill in the art, including copolymer propylene, polycarbonate, or acrylonitrile butadiene styrene. The cases 1601 & 1701 can be closed and secured using, for example, one or more double throw latches 1608, a key lock, a combination lock, or any other suitable fastening means. To further protect the components of the system 100, the cases 1601 & 1701 may be constructed so as to preclude liquid and particulate intrusion by arranging a gasket 1610 & 1706 along the perimeter edges of the case openings. A purge valve 1708 can be provided to equalize the pressure inside the cases 1601 & 1701 while still keeping liquid and other particulate out. The external case 1601 further includes a shoulder strap 1614 or handle 1616 for convenient hand carrying.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A secure communication system comprising:
   a mobile computing device without an integrated data storage device, the mobile computing device adapted to interchangeably receive a classified or unclassified data storage device;
   an encrypter device in signal communication with the mobile computing device;
   a network security device in signal communication with the encrypter device;
   a classified data storage device loaded with a computer readable code configured for booting the mobile computing device when the classified data storage device is connected to the mobile computing device; and
   an unclassified data storage device loaded with a computer readable code configured for booting the mobile computing device when the unclassified data storage device is connected to the mobile computing device.

2. The secure communication system of claim 1, wherein:
   (a) the mobile computing device is configured to not read data from or write data to the unclassified data storage device when the mobile computing device is booted from the classified data storage device; and
   (b) the mobile computing device is configured to not read data from or write data to the classified data storage device when the mobile computing device is booted from the unclassified data storage device.

3. The secure communication system of claim 1, wherein the mobile computing device does not include an integrated wireless communication system, an integrated camera, and an integrated microphone.

4. The secure communication system of claim 3, further comprising a trusted platform module integrated with the mobile computing device.

5. The secure communication system of claim 1, wherein the mobile computing device is semiruggedized.

6. The secure communication system of claim 1, further comprising a push to talk headset in signal communication with the mobile computing device.

7. The secure communication system of claim 1, further comprising a card reader in signal communication with the mobile computing device.

8. The secure communication system of claim 1, further comprising a web camera in signal communication with the mobile computing device.

9. The secure communication system of claim 1, wherein the network security device is in signal communication with the encrypter device through a wireless adapter and a wireless router.

10. The secure communication system of claim 1, wherein the network security device is in signal communication with a satellite network through a broadband global area network satellite terminal.

11. The secure communication system of claim 1, wherein the mobile computing device is booted from the classified data storage device and placed in signal communication with a remote network through an encrypted AES-256 communication link.

12. A secure communication system for connecting to a remote network comprising:
   a mobile computing device without an integrated data storage device, the mobile computing device adapted to interchangeably receive a classified or unclassified data storage device;
   an encrypter device with a first data port and a second data port, wherein the first data port is in signal communication with the mobile computing device;
   an adaptor with an encrypter port and a network port, wherein the encrypter port is in signal communication with the second data port and the network port is in signal communication with a network gateway;
   a classified data storage device loaded with a computer readable code configured for booting the mobile computing device when the classified data storage device is connected to the mobile computing device; and an unclassified data storage device loaded with a computer readable code configured for booting the mobile computing device when the unclassified data storage device is connected to the mobile computing device.

13. The secure communication system of claim 12, wherein the mobile computing device does not include an integrated wireless communication system, an integrated camera, and an integrated microphone.

14. The secure communication system of claim 13, wherein:
   (a) the mobile computing device is configured to not read data from or write data to the unclassified data storage device when the mobile computing device is booted from the classified data storage device; and
   (b) the mobile computing device is configured to not read data from or write data to the classified data storage device when the mobile computing device is booted from the unclassified data storage device.

15. The secure communication system of claim 14, further comprising a peripheral input-output device in signal communication with the mobile computing device, said peripheral input-output device selected from the group consisting of a push-to-talk headset, a web camera, or a card reader.

16. The secure communication system of claim 12, wherein the network gateway is a satellite phone.

17. The secure communication system of claim 12, wherein the network gateway is a multi-function cellular device.

18. The secure communication system of claim 12, wherein the network gateway is an end office switch of a public switched telephone network.

19. A secure communication system for connecting to a remote network comprising:
   a mobile computing device without an integrated data storage device, an integrated wireless communication system, an integrated camera, and an integrated microphone, wherein the mobile computing device adapted to interchangeably receive a classified or unclassified data storage device;
   a classified data storage device loaded with a computer readable code for booting the mobile computing device when the classified data storage device is connected to the mobile computing device; and
   an unclassified data storage device loaded with a computer readable code for booting the mobile computing device when the unclassified data storage device is connected to the mobile computing device.

20. The secure communication system of claim 19, wherein the classified data storage device and the unclassified data storage device are loaded with computer readable code for implementing secure video teleconferencing.

* * * * *